United States Patent [19]
Akiba et al.

[11] Patent Number: 5,784,350
[45] Date of Patent: Jul. 21, 1998

[54] DISK DRIVE APPARATUS WHICH ELIMINATES THE DISK EJECT BUTTON

[75] Inventors: Takao Akiba, Ohmiya; Katsuya Enami, Higashikurume, both of Japan

[73] Assignee: TEAC Corporation, Japan

[21] Appl. No.: 624,718

[22] Filed: Mar. 26, 1996

[30] Foreign Application Priority Data

Feb. 16, 1996 [JP] Japan .................. 8-029498

[51] Int. Cl.$^6$ ........................ G11B 17/04
[52] U.S. Cl. .................. 369/77.1; 360/99.06
[58] Field of Search ................... 369/77.1, 75.2, 369/77.2; 360/99.06, 99.02, 96.5, 96.6

[56] References Cited

U.S. PATENT DOCUMENTS 5,485,330  1/1996  Hirose et al. ................ 369/77.2

FOREIGN PATENT DOCUMENTS 7235415  9/1995  Japan .

*Primary Examiner*—Stuart S. Levy
*Assistant Examiner*—Kevin M. Watkins
*Attorney, Agent, or Firm*—Ladas & Parry

[57] ABSTRACT

A disk drive apparatus which eliminates the eject button on a front bezel and eliminates the opening for the eject button is provided. A tray carries a recording medium, and is movable between an eject position in which the recording medium in the tray is ejected and a disk loading position in which the recording medium is positioned inside the disk drive apparatus for reading operations. The tray is moved toward the eject position by a moving mechanism. The tray is maintained in the disk loading position by an engaging member engaging with the tray. An engagement of the tray is released by pressing the tray in a disk loading direction from the eject position to the disk loading position.

6 Claims, 11 Drawing Sheets

DISK DRIVE APPARATUS WHICH ELIMINATES THE DISK EJECT BUTTON

BACKGROUND OF THE INVENTION

1. Field of the Invention The present invention generally relates to a disk drive apparatus and, more particularly, to a disk drive apparatus having a tray accommodating a disk, the tray being ejected from the apparatus by actuation of a solenoid actuator by an eject switch. 2. Description of the Related Art A compact disk is used for recording information of a data base or programs as a recording medium, which compact disk is reproduced by means of a laser type pick-up method. The compact disk of this type is referred to as a CD-ROM, and the information recorded on the CD-ROM is reproduced by a CD-ROM drive apparatus. In recent years, a very small CD-ROM drive apparatus has been developed for a miniaturized notebook type personal computer so that the CD-ROM drive apparatus can be incorporated into a case of the notebook type personal computer.

Japanese Laid-Open Patent Application No.7-235415discloses an eject mechanism used in a CD-ROM drive apparatus of the above-mentioned type. This eject mechanism has an eject button provided on a front bezel. When the eject button is pressed, an eject switch provided inside the front bezel is turned on. Thus, a plunger of a solenoid actuator is operated by a signal supplied from the eject switch to release an engagement of a tray carrying a CD-ROM. Since the tray is urged in an ejecting direction, if an engaging member is moved to a disengaging position by the plunger, the tray moves in the ejecting direction.

The conventional eject mechanism requires an eject button assembling operation so that the eject button is mounted on a front side of the front bezel. Additionally, an assembling operation for the eject switch which is turned on by being pressed by the eject button is such that the eject switch is mounted on a back side of the front bezel. Since the front bezel is mounted on the tray, the eject switch is moved together with the tray. Thus, the eject switch must be connected to a circuit board located under the tray by a flexible cable. Accordingly, the assembling process for mounting the eject button, eject switch and the flexible cable requires a large amount of time and labor, and thus it is difficult to increase production of the CD-ROM drive apparatus.

Additionally, in the conventional structure, an opening is formed in the front bezel for mounting the eject button which protrudes from the opening. In such a structure, if an operator has a static charge, an electric discharge may be generated between the finger tip of the operator and a part provided inside the front bezel. Accordingly, in order to protect a circuit board from being damaged by such an electric discharge, a shielding member must be provided on the inner side of the front bezel.

SUMMARY OF THE INVENTION

It is a general object of the present invention to provide an improved and useful disk drive apparatus in which the above-mentioned problems are eliminated.

A more specific object of the present invention is to provide a disk drive apparatus which does not have an eject button on a front bezel.

Another object of the present invention is to provide a disk drive apparatus which does not have an opening in a front bezel of a tray carrying a disk-like recording medium.

In order to achieve the above-mentioned objects, there is provided according to the present invention a disk drive apparatus for reading information recorded on a disk-like recording medium, the disk drive apparatus comprising:

a tray supporting the recording medium, the tray being movable between an eject position in which the recording medium in the tray is ejected and a disk loading position in which the recording medium is positioned inside the disk drive apparatus for a reading operation; and a tray ejecting means for moving the tray toward the eject position, the tray ejecting means maintaining the tray in the disk loading position by engaging with the tray, an engagement of the tray being released by pressing the tray in a disk loading direction from the eject position to the disk loading position.

According to the above-mentioned invention, since the engagement of the tray is released by simply pressing the tray in the tray loading direction, the tray can be moved toward the eject position. Due to this, the eject button does not have to be mounted on a front side of the tray. Thus, the assembling operation of the eject button is eliminated, and the assembling time is also reduced. Additionally, since there is no need to form an opening for the eject button in a front bezel of the tray, electronic parts inside the apparatus do not have to be protected from an electric discharge which may be generated through the opening. Further, since any point of the tray can be pressed to start the ejecting operation of the tray, the operability for the ejecting operation of the tray is improved.

In one embodiment of the present invention, the tray ejecting means comprises a tray moving mechanism and an engaging mechanism, the tray moving mechanism moving the tray toward the eject position when the engagement of the tray is released, the engaging mechanism comprising an engaging member engaging with a portion of the tray so as to maintain the tray in the disk loading position, the engaging member being disengaged from the portion of the tray when the tray is moved from the disk loading position in the disk loading position.

Additionally, the engaging mechanism may comprise an actuator moving the engaging member and a first sensor outputting a first signal when the tray is moved from the disk loading position in the disk loading direction, the actuator being actuated to disengage the engaging member when the first signal is output from the first sensor. The first sensor may be a micro switch fixed relative to a chassis of the disk drive apparatus.

According to the present invention, the disk drive apparatus may further comprise a second sensor and controlling means for controlling an operation of the actuator, the second sensor outputting a second signal when the tray is positioned in the disk loading position and is further moved in the disk loading direction, the controlling means actuating the actuator when the first signal and the second signal are output so that the engagement of the engaging member is released. The second sensor may be a micro switch fixed relative to the chassis of the disk drive apparatus.

Additionally, the controlling means may actuate the actuator when the first signal is output after a predetermined period has elapsed since the second signal was output. The tray moving mechanism may move the tray to a position a predetermined distance away from the disk loading position.

Further, the tray moving mechanism may comprise a spring, a first end of the spring engaging the tray and a second end of the spring engaging a chassis of the disk drive apparatus so that the tray is urged in a direction opposite to the disk loading direction.

3

Other objects, features and advantages of the present invention will become more apparent from the following detailed description when read in conjunction with the accompanying drawings.

DETAILED DESCRIPTION OF THE PREFERRED EMBODIMENTS

Figure 1:
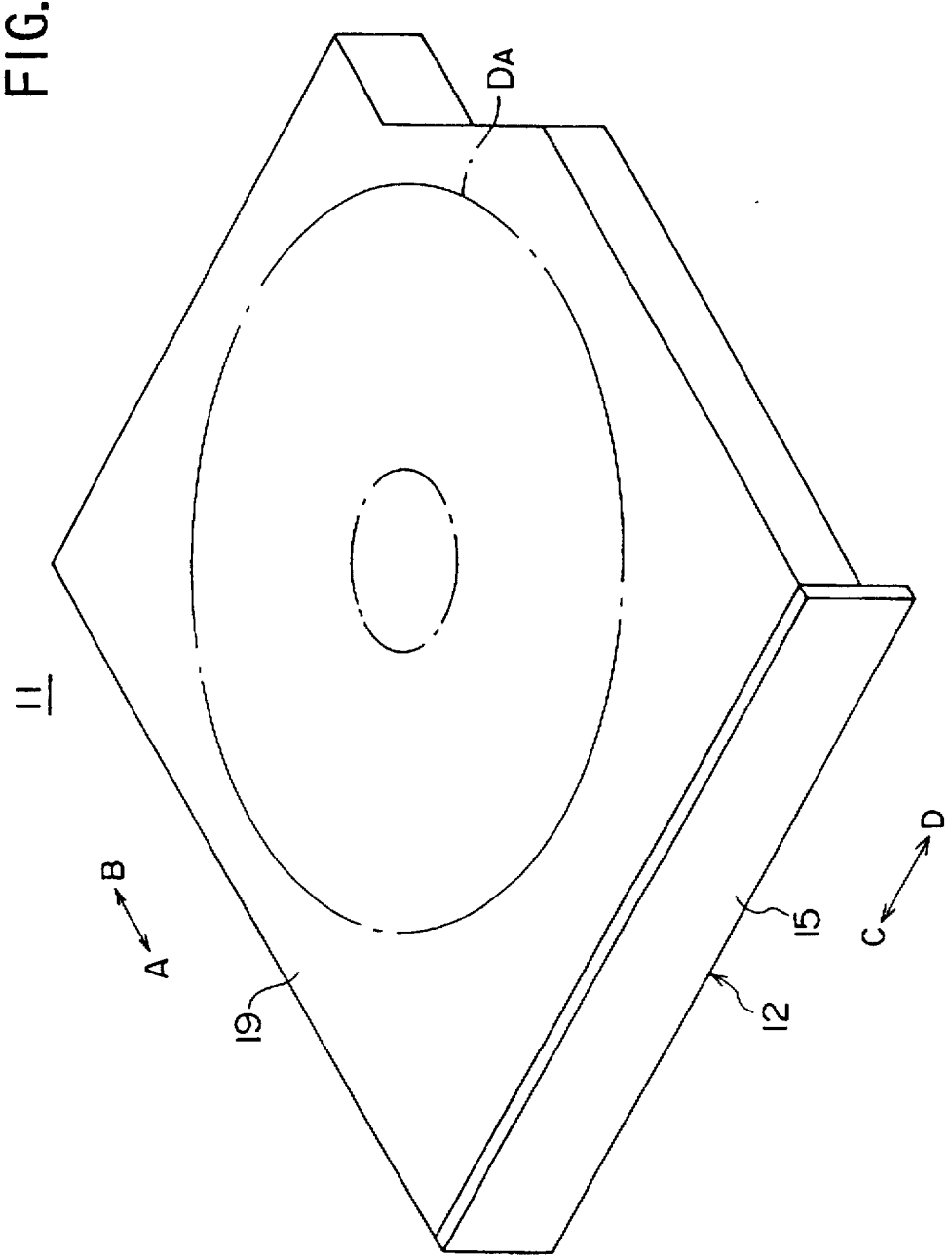
FIG. 1 is a perspective view of a CD-ROM drive apparatus according to an embodiment of the present invention.

A description will now be given of an embodiment of the present invention. FIG. 1 is a perspective view of a CD-ROM drive apparatus 11 according to the embodiment of the present invention.

The CD-ROM drive apparatus 11 (hereinafter referred to as an apparatus 11) is incorporated into a housing of a notebook type personal computer (not shown in the figure). The apparatus 11 is provided with a tray 12 which accommodates a disk (CD-ROM) $D_A$ and is slidable in a front-to-rear direction indicated by arrows A and B. The tray 12 moves in the direction B, and is engaged in a position where the tray 12 is accommodated inside the apparatus 11 when the disk is loaded. In the present invention, the tray 12 is ejected from the apparatus 11 by pressing a front bezel 15 of the tray 12 in the direction B as described below. Accordingly, no eject button is provided on the front bezel 15 of the tray 12.

Figure 2:
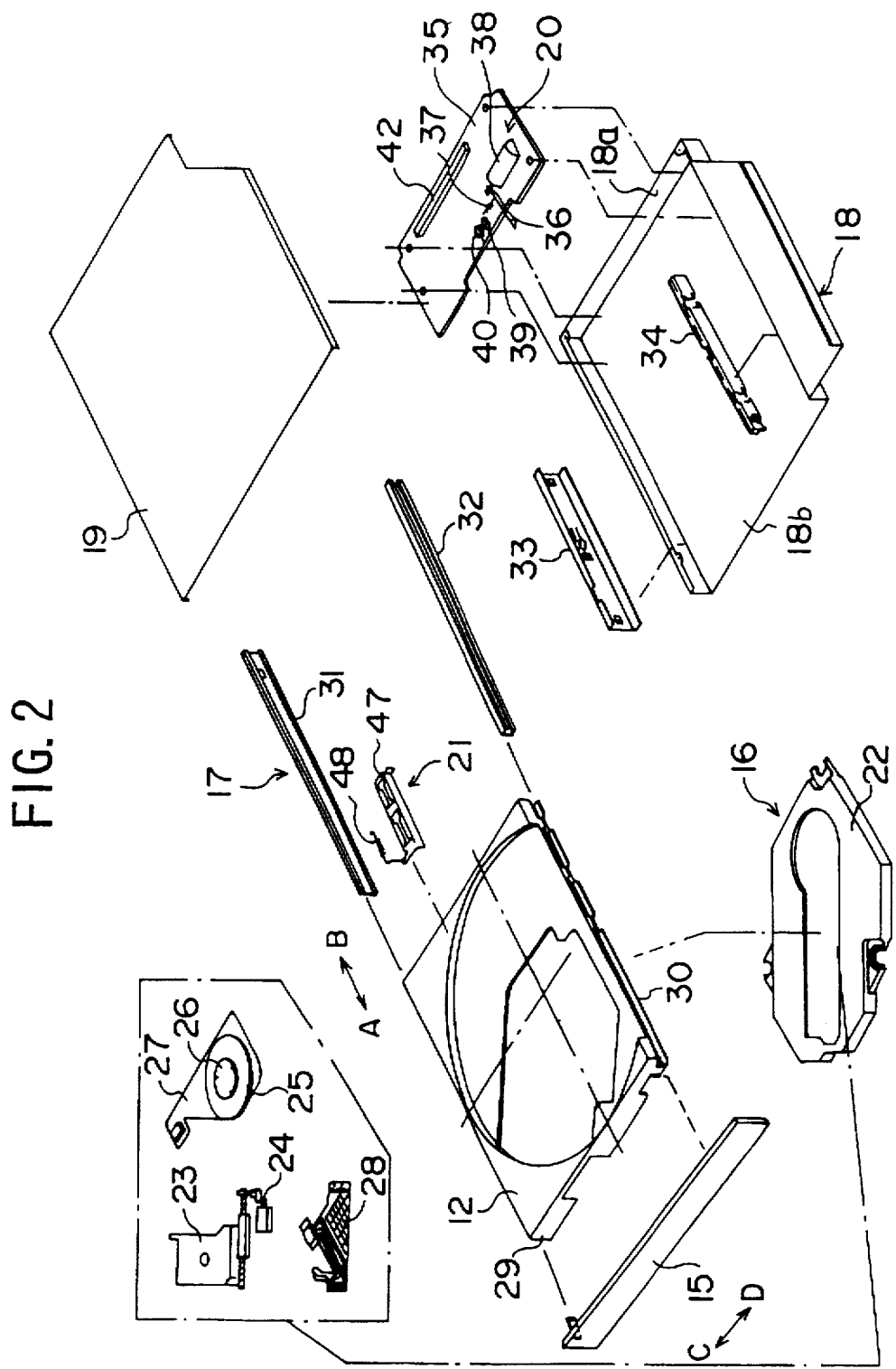
FIG. 2 is an exploded perspective view of the CD-ROM drive apparatus shown in FIG. 1.

FIG. 2 is an exploded perspective view of the CD-ROM drive apparatus 11. The apparatus 11 comprises the tray 12, a driving unit 16 mounted on a bottom surface of the tray 12, a tray guide mechanism 17 for guiding a sliding motion of the tray 12, a chassis 18 accommodating the tray 12 and a top plate 18 mounted on the chassis 18 to cover the tray 12 when it is accommodated inside the chassis 18.

The tray 12 has a width smaller than the diameter of the disk (not shown in the figure) so that a portion of the disk sticks out from a side of the tray 12. The tray 12 is moved by a hand operation in the directions A or B to be positioned either in an eject position or a disk loading position. Thus, any drive mechanism, which may comprise a motor and a transmitting mechanism, to drive the tray 12 is not provided in the apparatus 11. Accordingly, the number of parts of the apparatus 11 is reduced, and the apparatus 11 is reduced in size including its thickness.

4

Additionally, a bottom part of a tray accommodating portion 18b of the chassis 18 is provided with an eject mechanism 20 which ejects the tray 12 when the tray 12 is pressed in the direction B. Further, a pressing mechanism 21 is provided in a rear side under the tray 12 which urges the tray 12 in the direction A (ejecting direction).

The above-mentioned drive unit 16 comprises a base 22 fixed on a bottom surface of the tray 12, a pick-up 23 mounted on the base 22, a pick-up drive unit 24 which moves the pick-up 23 in a radial direction of the disk, a turntable 26 rotated by a spindle motor 25 and a flexible wiring board 28 which connects the pick-up 23 to a circuit board 27 of the spindle motor 25.

The tray guide mechanism 17 has slide rails 31 and 32 which slide when the tray 12 is moved in the direction A. Thus, the tray 12 pulled by the ejecting operation slides while it is supported by the fixed guide members 33 and 34 via the slide rails 31 and 32.

Figure 3:
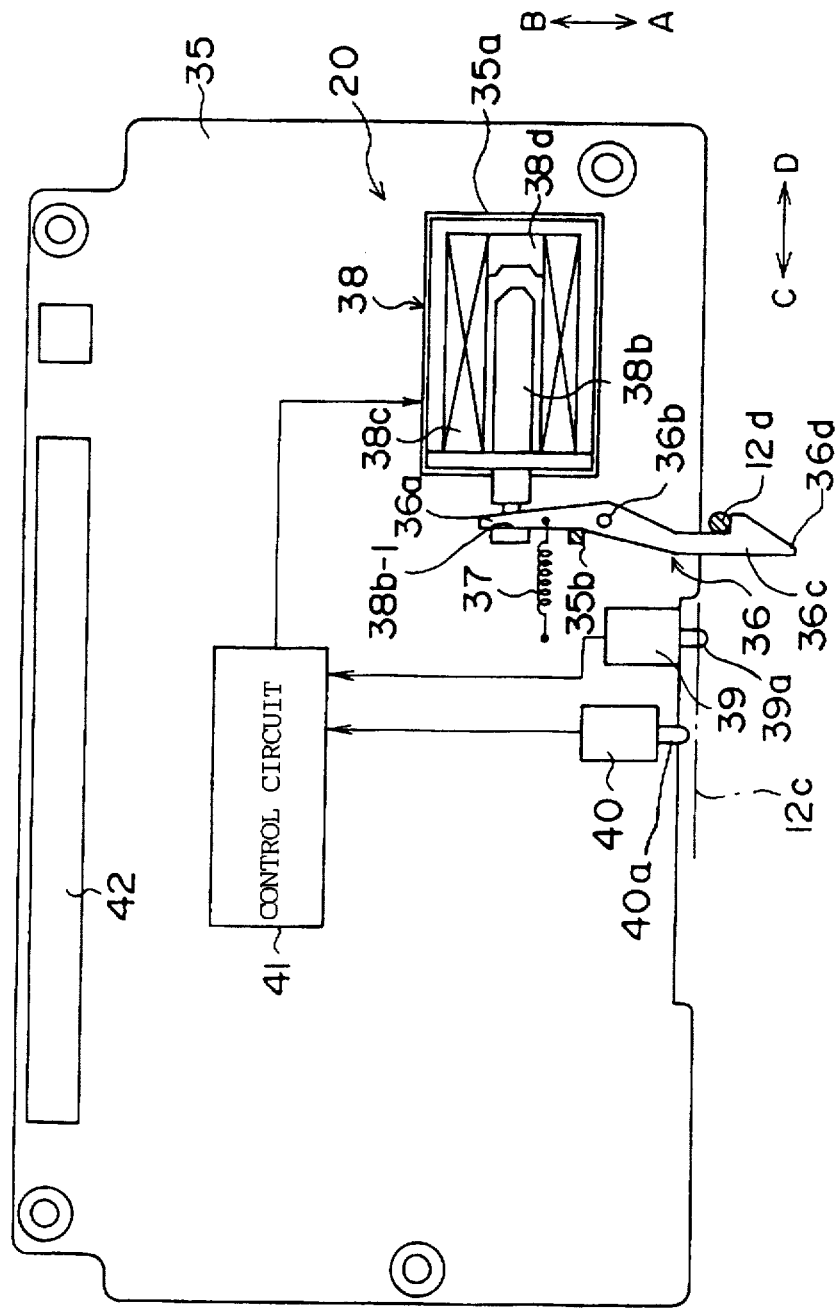
FIG. 3 is a plan view of an eject mechanism in a state where a tray is in an engaged position.
Figure 4:
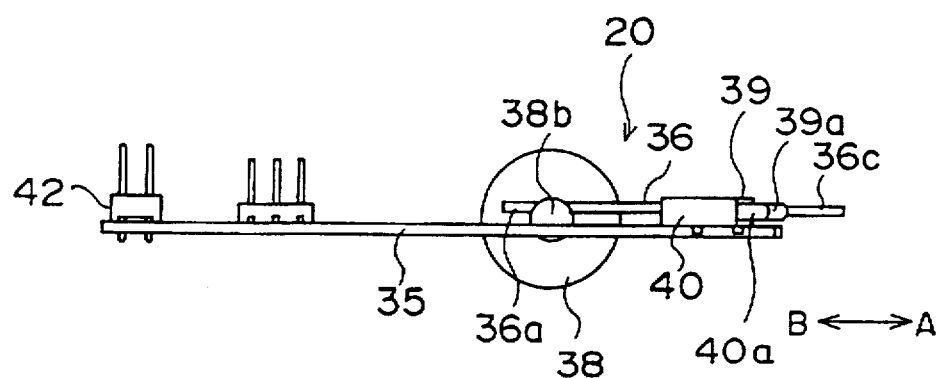
FIG. 4 is a side view of the eject mechanism shown in FIG. 3.

FIG. 3 is a plane view of the eject mechanism 20 which engages the tray 12 in the disk loading position. FIG. 4 is a side view of the eject mechanism 20.

The eject mechanism 20 incorporated into the apparatus 11 performs the ejecting operation when the front bezel of the tray 12 is pressed and moved in the direction B. The eject mechanism 20 comprises an engaging lever (engaging member) 36 which is provided on a top surface of a base board 35 and engages with the tray 12 in the disk loading position, a coil spring 37 which urges the engaging lever 36 in an engaging direction and a plunger 38b of a solenoid actuator 38 (hereinafter referred to as a solenoid 38) which drives the engaging lever 36 in a releasing direction.

The solenoid 38 is mounted on the base board 35 so that the solenoid is inserted in an opening 35a formed in the base board 35. The solenoid 38 comprises a main body 38a and the plunger 38b which is comprised of a movable iron core. A coil 38c and a fixed iron core 38d are accommodated in the main body 38a.

A groove 38b-1 is provided on an end of the plunger 38b so that an end 36a of the engaging lever 36 engages with the groove 38b-1. The plunger 38b is movable in directions indicated by arrows C and D in FIG. 3. The plunger 28b is moved in the direction D and bears against the fixed iron core 38d when the coil 38c is activated. Accordingly, the engaging lever 36 rotates from a tray engaging position to a releasing position according to a displacement of the plunger 38b.

The engaging lever 36 comprises the end 36a which engages with the groove 38b-1, a shaft 36b rotatably supported on the base board 35 and a hook-like engaging portion 36c engaging the tray 12. One end of the coil spring 37 is engaged with a portion adjacent to the end 36a of the engaging lever 36, and the other end of the coil spring 37 is engaged with the base board 35. Thus, the engaging lever 36 is maintained in the tray engaging position by being urged counterclockwise by the coil spring 37. It should be noted that the movement of the engaging lever 36 is limited by being urged against a stopper 35b protruded from the base board 35.

Additionally, the base board 35 is supported at a predetermined level higher than the level of the tray accommodating portion 18b of the chassis 18 via a spacer (not shown) interposed therebetween. A tray detecting micro switch 39 and an ejecting micro switch 40 are provided on the top surface of the base board 35. The tray detecting micro witch 39 detects the tray 12 being in the disk loading position. The ejecting micro switch 40 detects the tray 12 in the disk loading position being pressed in the direction B.

In the present embodiment, the tray detecting micro switch 39 is offset from the ejecting micro switch 40 in a front direction (the direction A) so as to provide a time difference between the detections of a tray detection signal and an eject signal. Thus, it is possible to determine whether the movement of the tray 12 is for a disk loading or an ejecting operation by the time difference between the tray detection signal and the eject signal when the ejecting micro switch 40 is turned on while the tray is loaded in the apparatus 11 as described later.

Additionally, the top surface of the base board 35 is provided with a control circuit 41 and a connector 42 which connects to external devices. The control circuit 41 energizes the solenoid 38 in accordance with the detection signals from the micro switches 39 and 40.

Figure 5:
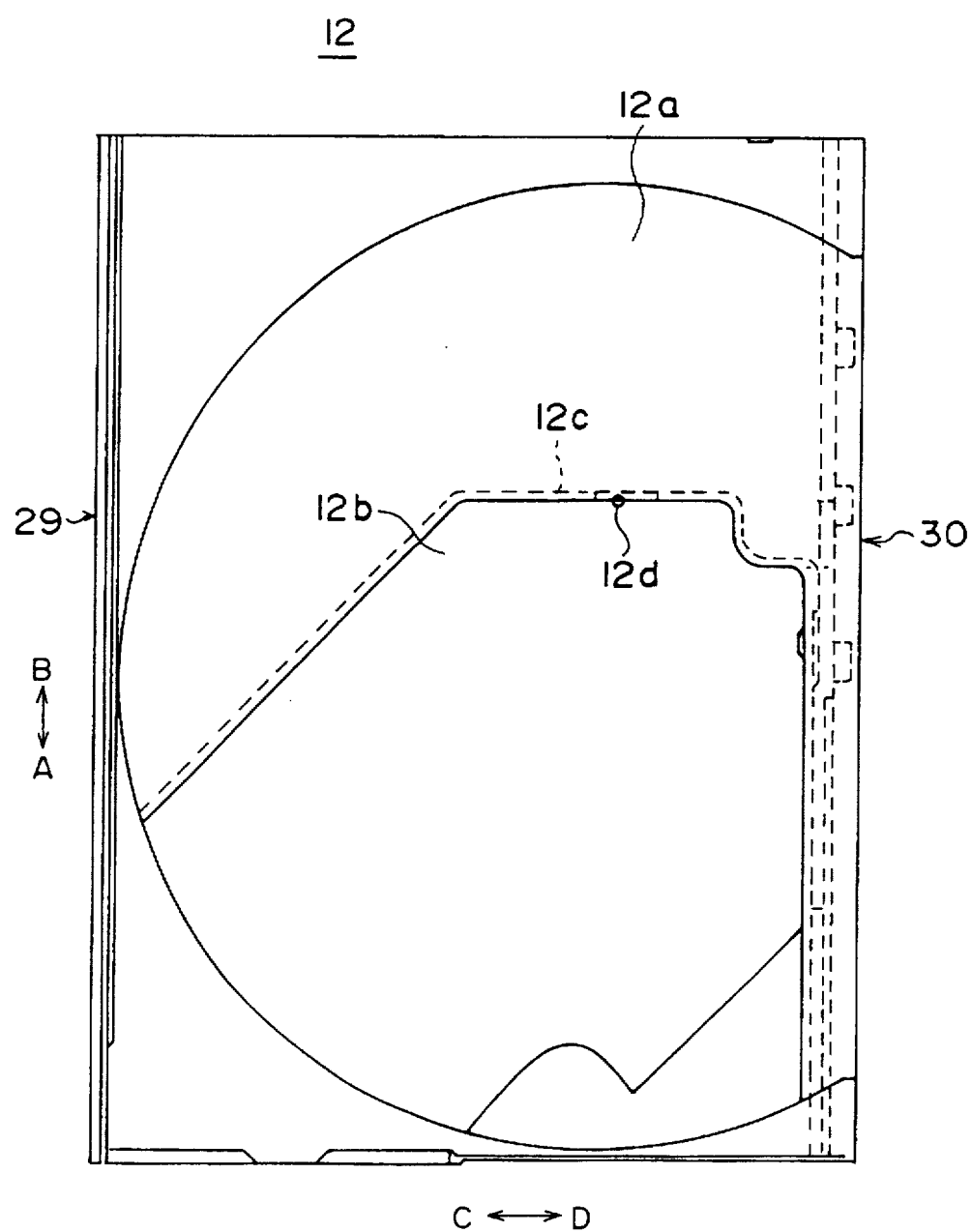
FIG. 5 is a plan view of the tray shown in FIG. 2.

As shown in FIG. 5, the tray 12 has a circular recess 12a, the diameter of which corresponds to an outer diameter of the disk $D_A$. An opening 12b is provided in a center portion of the circular recess 12a. The opening recess 12b corresponds to the pick-up 23 and the turntable 26. Additionally, rail engaging portions 29 and 30 provided on opposite sides of the tray 12 are integrally formed with the tray 12 by molding of the same plastic material. Accordingly, the number of parts constituting the tray 12 is reduced as compared to the conventional tray in which guiding members are mounted by screws on opposite sides.

A rib 12c and a boss 12d are integrally formed with the tray 12 so that the rib 12c and the boss 12d protrude downwardly from the edge of the opening 12b. The rib 12c is provided as a switch pressing part which makes a contact with contact elements 39a and 40a of the respective micro switches 39 and 40. The boss 12d is provided as an engaged part which is engaged by the engaging portion 36c of the engaging lever 36.

Accordingly, in the eject mechanism 20 as constructed above, the boss 12d, which protrudes on the bottom side of the tray 12 is engaged by the engaging portion 36c of the engaging lever 36 when the tray 12 is accommodated in the apparatus 11. Thereby, the tray 12 is engaged in the disk loading position. Thus, when the front bezel 15 is pressed in the direction B after the disk $D_A$ is clamped on the turntable 26, the tray 12 is moved to the disk loading position in which the boss 12d is engaged by the engaging lever 36.

Additionally, the pressing mechanism 21, which presses the tray 12 in the ejecting direction (direction A), moves the tray 12 by a predetermined distance in the direction A so as to facilitate the pulling operation of the tray 12 toward the disk replacing position (eject position). In the pressing mechanism 21 (refer to FIG. 2), a pressing lever 47 is urged in the direction B by a coil spring 48. The pressing lever 47 is slidably mounted on a pair of protrusions 46 protruding from the bottom surface of the tray 12. It should be noted that one end of the coil spring 48 is engaged with a spring engaging portion 47b formed on a front end of the pressing lever 47, and the other end of the coil spring 48 is engaged with a spring engaging pin 49 provided on the bottom surface of the tray 12.

Figure 9:
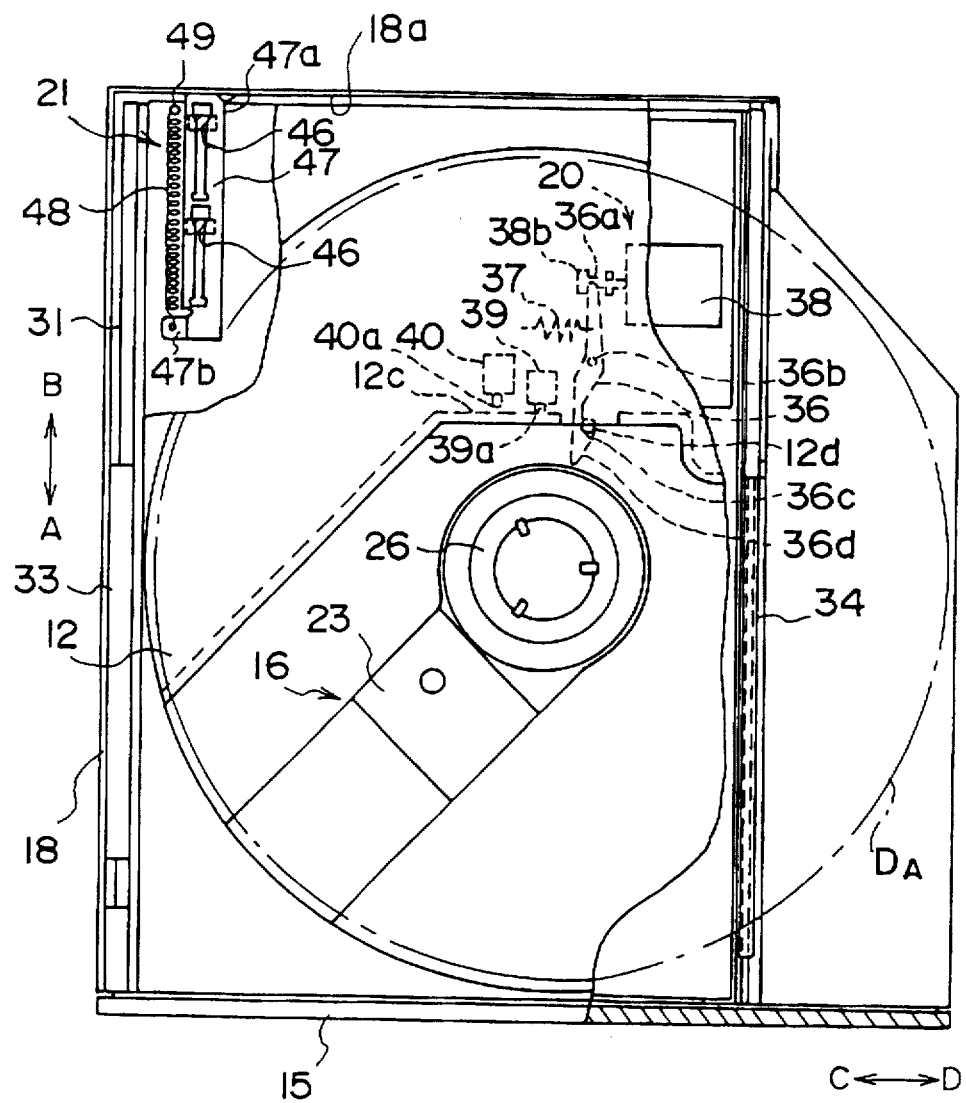
FIG. 9 is a plan view of the tray in the state where the tray is in the engaged position.

Additionally, in the pressing mechanism 21, as best illustrated in FIG. 9, a rear end 47a of the pressing lever 47 contacts a rear end wall 18a of the chassis 18 in the process in which the tray 12 enters into the apparatus 11. Thereby, the coil spring 48 is extended by a length of the pressing lever 47 which length corresponding to the length protruding in the rear direction of the tray 12. Thus, in a state where the tray 12 is accommodated inside the apparatus 11, that is, in the disk loading position, the pressing lever 47 presses the rear end wall 18a of the chassis 18 due to the spring force of the coil spring 48. Thus, the tray 12 is urged in the ejecting direction (direction A) by the reaction force.

Figure 6:
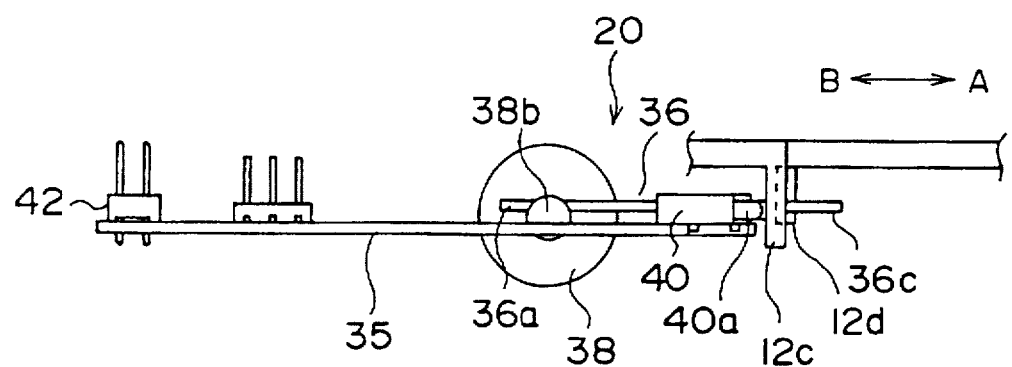
FIG. 6 is a side view of the eject mechanism in a state where the tray is in the engaged position.
Figure 7:
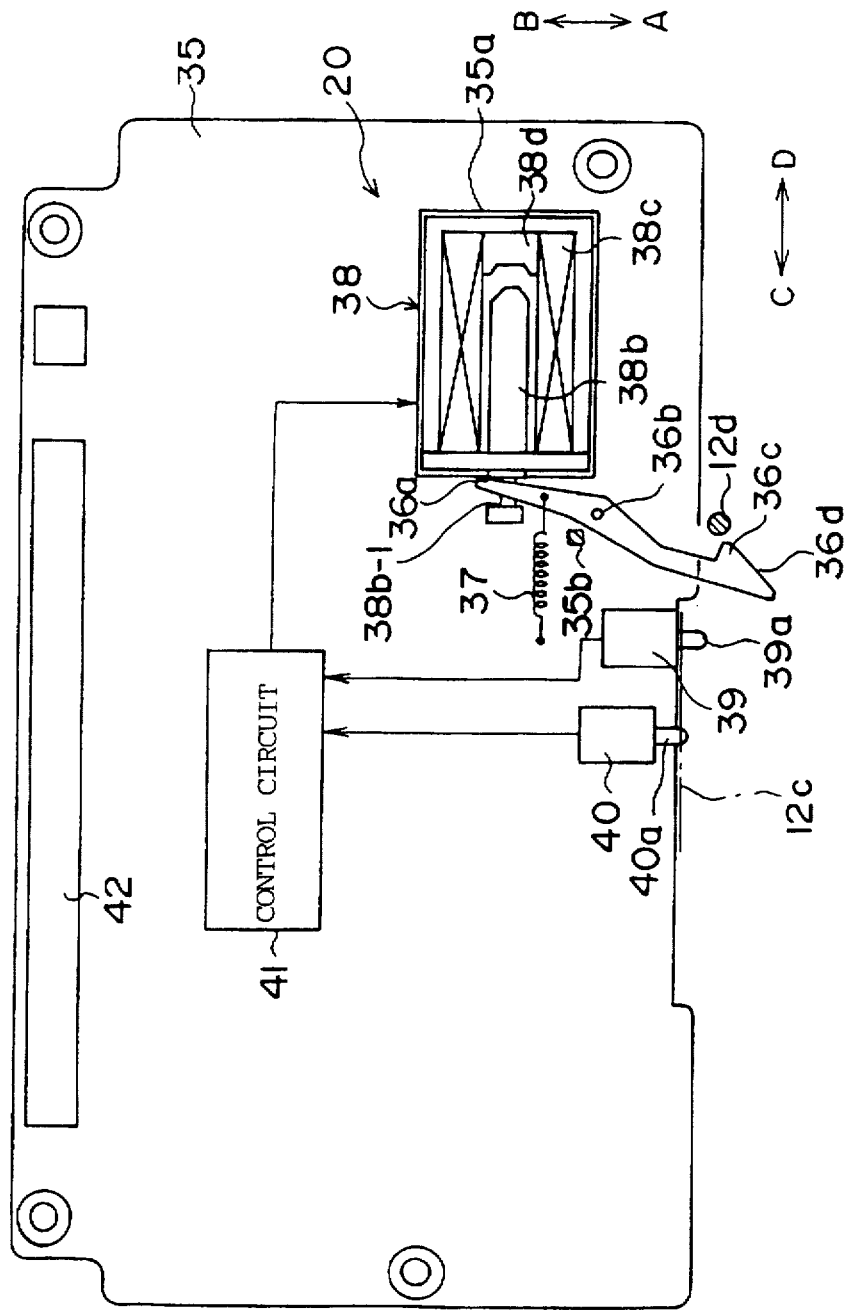
FIG. 7 is a plan view of the eject mechanism in a state where the tray is in a released position.

A description will now be given of an operation of the eject mechanism 20. FIG. 6 is a side view of the eject mechanism 20 in a state where the tray 12 is in the disk loading position. FIG. 7 is a plan view of the eject mechanism 20 for explaining an ejecting operation of the eject mechanism 20.

As shown in FIG. 6, when the front bezel 15 is pressed and the tray 12 moves to the disk loading position, the boss 12d which protrudes from the bottom surface of the tray 12 makes contact with a slant surface 36d of the engaging portion 36c of the engaging lever 36. Thus, the engaging lever 36 rotates clockwise against the spring force exerted by the spring 37. At this time, the end portion 36a of the engaging lever 36 is engaged with the groove 38b-1 of the plunger 38b of the solenoid 38. However, since a width of the groove 36a is larger than a width of the end portion 36a, the engaging lever 36 can rotate clockwise.

When the tray 12 reaches the disk loading position, the boss 12d of the tray 12 engages the engaging portion 36c of the engaging lever 36. Additionally, the rib 12c of the tray 12 makes contact with the contact element 39a of the tray detecting micro switch 39 which turns on the micro switch 39. Thus, it is detected by the detection signal from the micro switch 39 that the tray 12 is positioned in the disk loading position.

When the front bezel 15 is pressed again and the tray 12 moves in the direction B, the rib 12c of the tray 12 makes contact with the contact element 40a of the ejecting micro switch 40 which turns on the micro switch 40. At this time, the contact element 39a of the micro switch is also pressed and this state is maintained.

Thus, it is detected that the ejecting operation is performed, and the control circuit 41 energizes the coil 38c of the solenoid 38. Thus, as shown in FIG. 7, the plunger 38b of the solenoid 38 is moved in the direction D, and thus the engaging lever 36 is rotated clockwise. As a result, the engaging portion 36c of the engaging lever 36 moves away from the boss 12d which releases the engagement of the tray 12.

Thereafter, the tray 12 is pressed in the direction A due to the pressing operation of the pressing mechanism 21. Thus, the tray 12 is able to be pulled in the direction A to eject the disk in the tray 12.

As mentioned above, since the tray 12 can be moved to the eject position by pressing the front bezel 15 of the tray 12, the number of parts can be reduced as compared to the conventional apparatus. Additionally, there is no need to provide an eject button on the front bezel 15, the assembling operation is simplified, and the assembling time can be reduced. Additionally, since the ejecting operation of the tray 12 can be started by pressing any position of the front bezel 15, the operability of the apparatus can be improved as compared to the conventional apparatus having an eject button on a portion of the front bezel.

Figure 8:
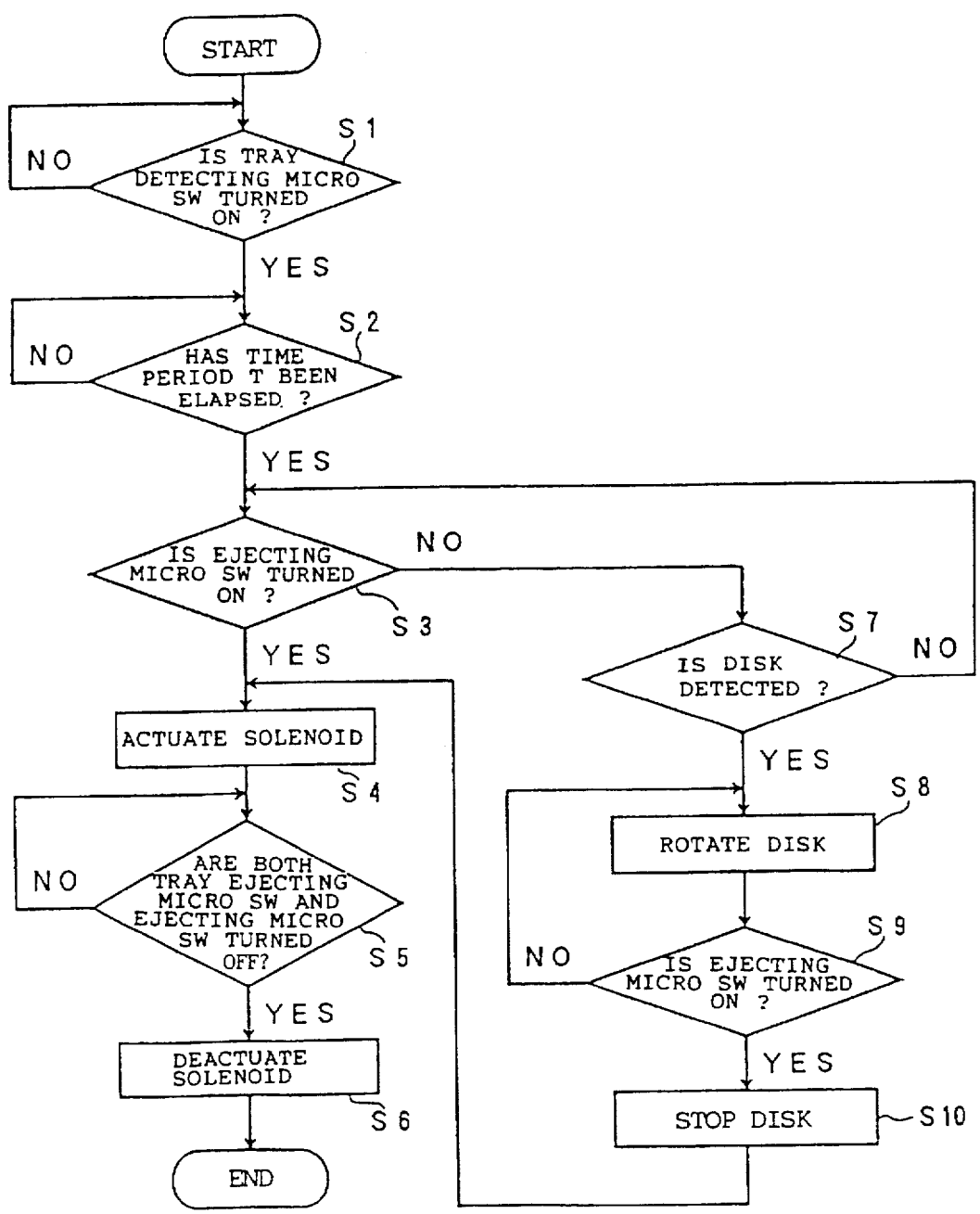
FIG. 8 is a flowchart for explaining an operation performed by a control circuit.

A description will now be given of a control operation of the control circuit 41 and operations of the eject mechanism 20 and the pressing mechanism 21. FIG. 8 is a flowchart of a process performed by the control circuit 41.

In step S1, the control circuit 41 determines whether or not the tray detecting micro switch is turned on. When the front bezel 15 is pressed in the direction B, the slant surface 36d of the engaging portion 36c of the engaging lever 36 slides about the boss 12d of the tray 12. That is, the engaging lever 36 rotates clockwise. When the slant surface 36d passes the boss 12d, the engaging lever 36 rotates counterclockwise since engaging lever 36 is urged by the coil spring 37. Thus, the boss 12d engages with the engaging portion 36c of the engaging lever 36. Accordingly, the tray 12 reaches the disk loading position as shown in FIG. 9 and is maintained in the disk loading position. Additionally, the rib 12c of the tray 12 makes contact with the contact element 39a of the micro switch 39 which turns the micro switch 39 to an on state.

At the same time, the rear end 47a of the pressing lever 47 makes contact with the rear end wall 18a of the chassis 18 in the process in which the tray 12 enters into the apparatus 11. Thereby, the coil spring 48 is extended by a length of the pressing lever 47 which length corresponding to the length protruding in the rear direction of the tray 12. Thus, in a state where the tray 12 is accommodated inside the apparatus 11, that is, in the disk loading position, the pressing lever 47 presses the rear end wall 18a of the chassis 18 due to the spring force of the coil spring 48. Thus, the tray 12 is urged in the ejecting direction (direction A) by the reaction force.

When the tray detecting micro switch 39 is turned on by the above-mentioned loading operation, the routine proceeds to step S2 so as to determine whether or not a predetermined time period T (for example, T=5 sec in the present embodiment) has elapsed. If the time period T has been elapsed, the routine proceeds to step S3 so as to determine whether or not the ejecting micro switch 40 is turned on.

It should be noted that the reason for waiting for the passage of the time period T is that there is a possibility that the micro switch 40 is turned on after the tray 12 passes the disk loading position due to the front bezel 15 being continuously pressed. In this case, the micro switch 40 is turned on immediately after the micro switch 39 is turned on and the pressing operation is stopped before the time period T has elapsed, the determination is made after the predetermined period T has elapsed. This eliminates the problem in that the tray 12 cannot be maintained in the disk loading position due to a release of the engagement of the tray 12 which is a result of the determination that the ejecting micro switch 40 is turned on.

Figure 10:
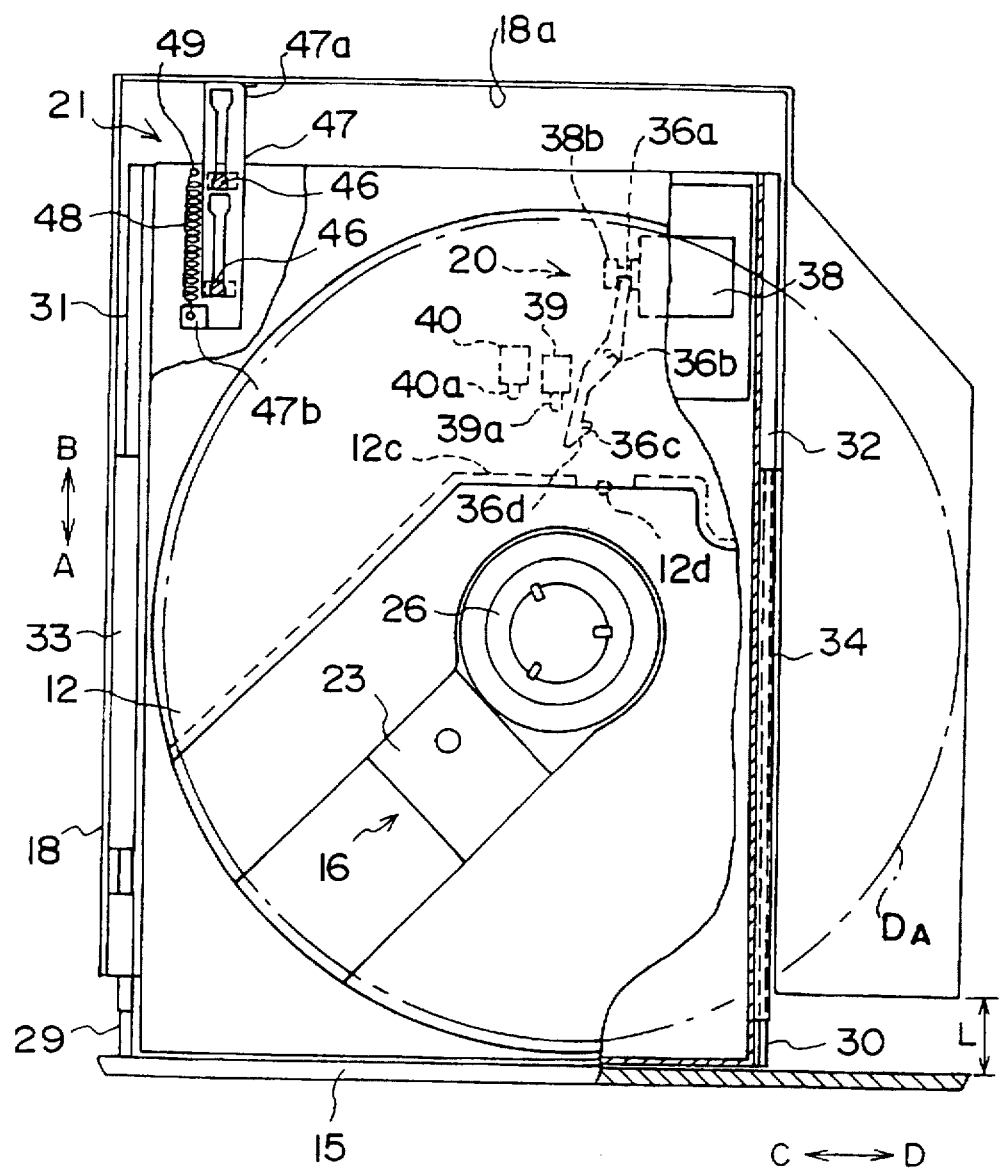
FIG. 10 is a plan view in the state where the tray is in the released position.

As shown in FIG. 10, when the front bezel 15 is pressed in the direction B, the rib 12c of the tray 12 presses the contact element 40a of the ejecting micro switch 40 which condition turns on the micro switch 40. Thus, if it is determined, in step S3, that the micro switch is turned on, the routine proceeds to step S4 so as to actuate the solenoid 38 and rotate the engaging lever 36 in the engagement releasing direction (clockwise).

As mentioned above, when the engaging lever 36 performs the engagement releasing operation by the front bezel 15 being pressed, the tray 12 is pushed out of the apparatus 11 in the ejecting direction (direction A) by the reaction force since the pressing lever 47 of the pressing mechanism 21 presses the rear end wall 18a of the chassis 18 by the spring force of the coil spring 48.

After the pressing force to the front bezel 15 is removed, the tray 12 moves to a position in which the front bezel 15 is positioned a predetermined distance L away from the chassis 18. That is, the tray 12 is pushed to an extent that a finger of the operator can engage with the front bezel so as to pull the tray 12 by the finger.

Thereafter, in step S5, it is determined whether or not the tray detecting micro switch 39 and the ejecting micro switch 40 are turned off. When the tray 12 is moved from the disk loading position in the direction A by the pressing force applied to the front bezel 15, the rib 12c of the tray 12 is spaced from the contact element 39a of the tray ejecting micro switch 39 and the contact element 40a of the ejecting micro switch 40. Thus, the tray detecting micro switch 39 and the ejecting micro switch 40 are turned off. When it is determined, in step S5, that both the tray detecting micro switch 39 and the ejecting micro switch 40 are turned off, the routine proceeds to step S6 so as to cut off a current supplied to the solenoid 38 to deactuate the solenoid 38. Thus, the engaging lever 36 returns the engaging position by the spring force of the coil spring 37.

Figure 11:
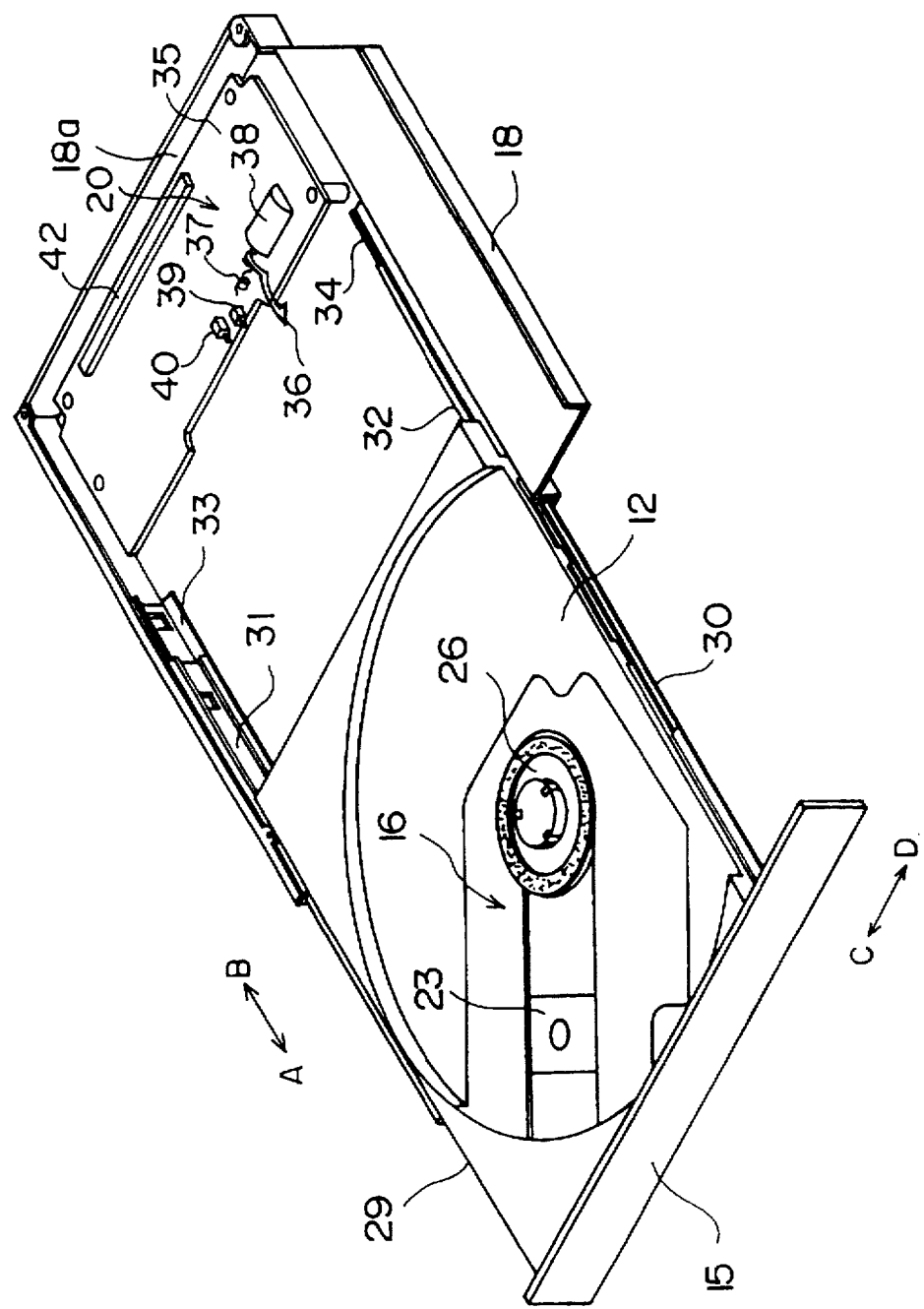
FIG. 11 is a perspective view of the CD-ROM drive apparatus in a state in which the tray is in an eject position.

FIG. 11 is a perspective view of the apparatus 11 in a state where the tray 12 is in the eject position. When the operator pulls the front bezel 15 in the direction A, the tray 12 moves in the direction A together with the slide rails 31 and 32 moving in the same direction. When the tray 12 reaches the disk replacing position in which an entire disk $D_A$ accommodated in the tray 12 is exposed, the disk $D_A$ is easily taken out from the tray 12 to replace it.

After the disk is replaced, the tray can be pressed into the apparatus 11 by the pressing force applied to the front bezel 15, and is maintained in the disk loading position by the engaging portion 36c of the engaging lever 36 being engaged with the boss 12d of the tray 12.

On the other hand, if it is determined, in step S3, that the ejecting micro switch 40 is not turned on, the routine proceeds to step S7 so as to determine whether or not the disk $D_A$ loaded on the turntable 26 is detected by the pick-up 23. If the pick-up 23 detects the disk $D_A$, the routine proceeds to step S8 so as to rotate the disk $D_A$ by driving the turntable 26 and read information recorded on the disk $D_A$ by the pick-up 23.

If the disk $D_A$ is not detected in step S7, this means that the disk $D_A$ is not loaded, and thus the routine returns to step S3 so as to repeat the steps S3 and S7 until the ejecting operation is started.

Thereafter in step S9, it is determined whether or not the ejecting micro switch 40 is turned on. If the ejecting micro switch 40 is not turned on, this means that the ejecting operation has not started yet and the tray is in the disk loading position, and thus the routine returns to step S8 so as to repeat the steps S8 and S9.

On the other hand, if it is determined, in step S9, that the ejecting micro switch 40 is turned on, it is determined that the front bezel 15 of the tray 12 is pressed, and thus the turntable 26 is stopped to stop the rotation of the disk $D_A$. Thereafter, the routine returns to step S4 as discussed above so as to execute the steps S4 to S6 to perform the ejecting operation.

The present invention is not limited to the CD-ROM drive apparatus, and may be applied to other disk-like recording medium 5 such as a CD, a magnetic disk, a magneto-optical disk or an optical disk.

Additionally, although the tray 12 is moved manually in the above-mentioned embodiment, the present invention may be applied to a disk drive apparatus having a tray moving mechanism in which a tray is moved by a driving means comprising a motor and the like.

In the above-mentioned embodiment, the tray detecting micro switch 39 and the ejecting micro switch 40 are provided on the base board 35 which is fixed to the chassis 18. However, in an alternative case, the tray detecting micro switch 39 and the ejecting micro switch 40 may be mounted on the rear portion of the tray 12.

In the above-mentioned embodiment, the displacement of the tray 12 is detected by micro switches. However, in an alternative case, the displacement of the tray 12 may be detected by a sensor such as a photodetector mounted on the base board, for example.

Additionally, in the above-mentioned embodiment, the engagement of the tray 12 is released by activating the solenoid actuator 38 by pressing the front bezel 15 of the tray 12. However, the present invention is not limited to the solenoid 38, and an actuator of another type may be used as the mechanism for releasing the engagement of the tray 12.

The present invention is not limited to the specifically disclosed embodiments, and variations and modifications may be made without departing form the scope of the present invention.

What is claimed is:

1. A disk drive apparatus for reading information recorded on a disk-like recording medium, the disk drive apparatus comprising:

a tray supporting the recording medium, said tray being movably supported by a rail and movable between an eject position in which the recording medium in said trays is ejected and a disk loading position in which said recording medium is positioned inside said disk drive apparatus for reading operations, and being movable from the disk loading position to a release position further inside the disk loading position;

a tray ejecting means for moving said tray toward said eject position, said tray ejecting means maintaining said tray in said disk loading position by an engagement of said tray ejecting means with said tray, the engagement of said tray and said tray ejecting means being released by pressing said tray, when the tray is maintained in said disk loading position, in a disk loading direction that is from said eject position to said disk loading position, wherein said tray ejecting means comprises a tray moving mechanism and an engaging mechanism, said tray moving mechanism moving said tray toward said eject position when the engagement of said tray is released, said engaging mechanism comprising an engaging member engaging with a portion of said tray so as to maintain said tray in said disk loading position, said engaging member being disengaged from said portion of said tray when said tray is further moved from said disk loading position to said release position in said disk loading direction; and wherein said engaging mechanism comprises an actuator for moving said engaging member, and a first sensor outputting a first signal when said tray is moved into said disk loading position in said disk loading direction, said actuator being actuated to engage said engaging member when said first signal is output from said first sensor; and a second sensor and controlling means for controlling operation of said actuator, said second sensor outputting a second signal when said tray is further moved from said disk loading position into said release position, said controlling means actuating said actuator to release the engagement of said engaging member when said second signal is output after a predetermined time has elapsed after output of the first signal.

2. The disk drive apparatus as claimed in claim 1, wherein said first sensor is a micro switch fixed relative to a chassis of said disk drive apparatus.

3. The disk drive apparatus as claimed in claim 1, wherein said second sensor is a micro switch fixed relative to said chassis of said disk drive apparatus.

4. The disk drive apparatus as claimed in claim 1, wherein said tray moving mechanism moves said tray to a position a predetermined distance away from said disk loading position.

5. The disk drive apparatus as claimed in claim 4, wherein said tray moving mechanism comprises a spring, a first end of said spring engaging said tray and a second end of said spring engaging a chassis of said disk drive apparatus so that said tray is urged in a direction opposite to said disk loading direction.

6. A method of operating a disk tray in a disk drive without a disk eject button, comprising the steps of pressing the disk tray in a disk loading direction in which the disk tray is moved into the disk drive; determining whether a tray detecting micro switch is turned on; waiting for passage of a predetermined time period to see whether the tray detecting micro switch is still on; if the tray detecting micro switch is still on, determining whether an ejecting micro switch is turned on; if the ejecting micro switch is not turned on, detecting presence of a disk in the disk tray and then operating the disk; if the disk ejecting micro switch is turned on, actuating an ejection mechanism to release engagement of the tray; and if both of the tray detecting micro switch and ejecting micro switch are determined being turned off, deactuating the ejection mechanism thereby returning the engagement of the tray.

* * * * *